United States Patent
Sasaki et al.

(10) Patent No.: US 9,890,055 B2
(45) Date of Patent: Feb. 13, 2018

(54) METHOD FOR PRODUCING HEMATITE FOR IRONMAKING

(71) Applicant: SUMITOMO METAL MINING CO., LTD., Tokyo (JP)

(72) Inventors: Hideki Sasaki, Tokyo (JP); Yasumasa Kan, Tokyo (JP); Hiroyuki Mitsui, Tokyo (JP)

(73) Assignee: SUMITOMO METAL MINING CO., LTD., Tokyo (JP)

(*) Notice: Subject to any disclaimer, the term of this patent is extended or adjusted under 35 U.S.C. 154(b) by 60 days.

(21) Appl. No.: 14/915,698

(22) PCT Filed: Sep. 4, 2014

(86) PCT No.: PCT/JP2014/073358
§ 371 (c)(1),
(2) Date: Mar. 1, 2016

(87) PCT Pub. No.: WO2015/041064
PCT Pub. Date: Mar. 26, 2015

(65) Prior Publication Data
US 2016/0194215 A1    Jul. 7, 2016

(30) Foreign Application Priority Data
Sep. 18, 2013 (JP) ................. 2013-193019

(51) Int. Cl.
*C01G 49/00* (2006.01)
*C01G 49/06* (2006.01)
*C22B 3/00* (2006.01)

(52) U.S. Cl.
CPC ............ *C01G 49/06* (2013.01); *C22B 23/043* (2013.01); *C22B 23/0461* (2013.01); *C01P 2006/80* (2013.01); *Y02P 10/212* (2015.11)

(58) Field of Classification Search
CPC .... C01G 49/06; C22B 23/043; C22B 23/0461
USPC ...................................................... 423/141
See application file for complete search history.

(56) References Cited

U.S. PATENT DOCUMENTS

| 4,305,914 A * | 12/1981 | Pammenter .............. C01G 9/06 423/106 |
| 5,453,253 A | 9/1995 | Von Ropenack |
| 6,428,604 B1 | 8/2002 | Kerfoot et al. |
| 2005/0265910 A1 | 12/2005 | Kobayashi et al. |
| 2007/0295613 A1 | 12/2007 | Moyes et al. |
| 2008/0053276 A1 | 3/2008 | Liu et al. |
| 2010/0031777 A1 | 2/2010 | Akiyama et al. |

FOREIGN PATENT DOCUMENTS

| CA | 2891140 A1 | 3/2010 |
| CA | 2678724 C | 2/2016 |
| JP | 48-016811 | 3/1973 |
| JP | 3176081 A | 7/1991 |
| JP | 2004-509232 | 3/2004 |
| JP | 2005-350766 | 12/2005 |
| JP | 2007-77459 | 3/2007 |
| JP | 200777459 A | 3/2007 |
| JP | 2007-530778 | 11/2007 |
| JP | 2008-530356 | 8/2008 |
| JP | 2010-95788 | 4/2010 |
| WO | 2008/032634 | 3/2008 |

OTHER PUBLICATIONS

International Search Report.

* cited by examiner

*Primary Examiner* — Steven Bos
(74) *Attorney, Agent, or Firm* — Gerald E. Hespos; Michael J. Porco; Matthew T. Hespos

(57) ABSTRACT

A method of producing (high-purity) hematite for ironmaking includes adding an oxidant and sulfuric acid to nickel oxide ore and then leaching nickel. The method further includes forming a neutralized residue having a sulfur grade exceeding 1.0% by weight by adding a neutralizing agent to leach slurry and being subjected to solid-liquid separation. The neutralizing agent functions to form plaster by reaction with a free sulfuric acid of surplus acid contained in the leach slurry. The leach slurry is a mixture of a leachate and a leach residue obtained after leaching the nickel. The method then includes heating the neutralized residue at a heating temperature of 600° C. or more and 1400° C. or less to form hematite having a sulfur grade of 1.0% or less by weight.

9 Claims, 2 Drawing Sheets

METHOD FOR PRODUCING HEMATITE FOR IRONMAKING

BACKGROUND

1. Field of the Invention

The present invention relates to a production method for refining a leach residue obtained by hydrometallurgical refining of nickel oxide ore into hematite that can be used as an iron-making raw material and has low-grade sulfur.

2. Description of the Related Art

In steel smelting, a method of charging iron ore containing iron oxide into a blast furnace along with a reductant such as coke, heating and melting the iron ore under a reducing atmosphere to obtain crude steel, and refining the crude steel in a converter to obtain desired steel has been used.

The iron oxide that is a raw material of the steel is a limited resource, and furthermore it is gradually hard to obtain high-quality iron ore required to maintain a quality of steel.

Meanwhile, with respect to nickel becoming a raw material of stainless steel, technology for smelting low-grade oxide ore as a raw material due to a tendency toward resource exhaustion of sulfide ore that has been used in the past has been developed and put to practical use.

To be specific, nickel oxide ore such as limonite or saprolite is put into a pressure device such as an autoclave along with a sulfuric acid, and nickel is leached under high pressure and high temperature of about 240 to 260° C.

The nickel leached into a solution of the sulfuric acid is used as nickel metal or a nickel salt compound by adding a neutralizing agent to neutralize surplus acid, separating a leach residue by solid-liquid separation, separating impurities to recover the leach residue as an intermediate raw material in the form of hydroxide or sulfide, and further refining the intermediate raw material.

In such a process called high pressure acid leach (HPAL), nickel can be almost completely leached even from low-grade ore in which valuable metals intended for recovery are contained by not more than 1% to 2% by weight (hereinafter indicated by "%" with regard to a grade). Further, the HPAL process has a feature of concentrating the valuable metals up to the same grade as a conventional raw material by producing an intermediate raw material from a leachate, and refining the nickel in a process similar to a conventional process.

Further, the HPAL process may be applied to various types of ores such as nickel sulfide ore, copper sulfide ore, and copper oxide ore, in addition to the nickel oxide ore.

Further, a main component of the leach residue obtained by the HPAL process is iron oxide having the form of hematite. This is secondarily obtained because each of oxide ore and sulfide ore of nickel or copper used as a raw material contains iron of an amount far more than a content of nickel or copper.

These leach residues are created at a high temperature, and thus have the form of oxide that is chemically or environmentally stable. However, the leach residues have no special utility value, and have been scrapped to a residue disposal yard that is called a tailings dam. For this reason, it has been a grave challenge how to secure the disposal yards for an enormous amount of leach residues generated along with the smelting.

Furthermore, the leach residue of the HPAL process cannot be directly used for the aforementioned iron-making raw material. The reason is that the leach residue of the HPAL process contains gangue and impurities, particularly sulfur, in addition to the iron oxide and requires exhaust gas treatment, and thus is not suitable for the raw material used in the conventional iron-making process in common.

Particularly, a grade of sulfur in iron oxide usable for the iron-making raw material differs depending on facility capacity and an amount of production of individual ironworks, and generally needs to be suppressed to less than 1%.

Such sulfur is hardly contained in the original nickel oxide ore. Nevertheless, the leach residue contains about 1 to 3% of sulfur. This results from halotrichite generated in combination to iron ion or cation, that is contained in the nickel oxide ore, in the form of sulfate ion due to sulfuric acid used for the nickel leaching during the HPAL process, and further from calcium sulfate (plaster) generated by reaction of sulfuric acid and limestone or slaked lime that has been added as the neutralizing agent to neutralize surplus acid (free sulfuric acid) remaining in the leach slurry.

Therefore, it is assumed that formation of plaster due to sulfur is prevented by using what forms a soluble salt as a neutralizing agent to be added, instead of what forms insoluble precipitate, such as limestone or slaked lime, after the neutralization, thereby decreasing a grade of sulfur contained in hematite.

For example, a neutralizing agent suitable for such application includes sodium hydroxide, potassium hydroxide, magnesium hydroxide, and magnesium oxide.

However, these neutralizing agents are expensive, and have a limited amount of production. Thus, when a large quantity of neutralizing agent is required as in the HPAL process, it is industrially difficult to cover the whole quantity.

For this reason, there has been no choice but to use a calcium-based neutralizing agent, in whole or in part, which forms insoluble precipitate after the neutralization as described above, and thereby mixing of sulfur has been inevitable. As such, it has been impossible to process the leach residue produced in the HPAL process into the hematite and to use it as the iron-making raw material.

Meanwhile, a method of separating sulfur contained in jarosite using a pressure device such as an autoclave is also known.

For example, JP H03-176081 A discloses a method that includes stirring a jarosite-containing residual and a zinc sulfide inclusion in an autoclave at least under oxygen partial pressure of 1000 kPa at a temperature of 130 to 170° C. along with a free sulfuric acid of 40 to 100 g/l, substantially dissolving iron and zinc fractions of a concentrate containing the residual and zinc sulfide, introducing the solution into a leach circulation passage for zinc electrolysis to settle iron in the form of hematite, and separating sulfur from the above solid, and supplying the residual for separate application.

However, this method has problems of requiring an expensive device such as an autoclave, increasing a facility cost, and having a problem even in the aspect of productivity.

SUMMARY

The present invention is intended to provide a production method for refining hematite, which has such a low sulfur component as to be used as an iron-making raw material, from a leach residue containing iron oxide produced by a high pressure acid leach (HPAL) process.

To solve the above problems, a first aspect of the invention provides a method for producing (high-purity) hematite for ironmaking by an HPAL process of adding an oxidant and sulfuric acid to nickel oxide ore and then leaching nickel. The method further includes: forming a neutralized residue having a sulfur grade exceeding 1.0% by weight in such a manner that leach slurry, that is a mixture of a leachate and a leach residue obtained after leaching the nickel are mixed, is added with a neutralizing agent serving to form plaster by reaction with a free sulfuric acid of surplus acid contained in the leach slurry, and is then subjected to solid-liquid separation; and forming hematite having a sulfur grade of 1.0% or less by weight by heat treatment of the formed neutralized residue at a heating temperature of 600° C. or more and 1400° C. or less.

A second aspect of the present invention provides a method for producing (high-purity) hematite for ironmaking by an HPAL process of adding an oxidant and sulfuric acid to nickel oxide ore and then leaching nickel. The method further includes: forming a neutralized residue having a sulfur grade exceeding 1.0% by weight in such a manner that leach slurry, that is a mixture of a leachate and a leach residue obtained after leaching the nickel are mixed, is added with a neutralizing agent serving to form a sulfur component in the form of halotrichite by reaction with a free sulfuric acid of surplus acid contained in the leach slurry, and is then subjected to solid-liquid separation; and forming hematite having a sulfur grade of 0.6% or less by weight by heat treatment of the formed neutralized residue at a heating temperature of 600° C. or more and 1400° C. or less.

A third aspect of the present invention provides a method for producing (high-purity) hematite for ironmaking by an HPAL process of adding an oxidant and sulfuric acid to nickel oxide ore and then leaching nickel. The method further includes: forming a neutralized residue having a sulfur grade exceeding 1.0% by weight in such a manner that leach slurry, that is a mixture of a leachate and a leach residue obtained after leaching the nickel are mixed, is added with two types of neutralizing agents, one serving to form sulfur in the form of halotrichite and another serving to form plaster by reaction with a free sulfuric acid of surplus acid contained in the leach slurry, and is then subjected to solid-liquid separation; and forming hematite having a sulfur grade of 0.8% or less by weight by heat treatment of the formed neutralized residue at a heating temperature of 600° C. or more and 1400° C. or less.

A fourth aspect of the present invention provides the method for producing the hematite for ironmaking according to any one of aspects 1 to 3, wherein the heating temperature of the heat treatment is 800° C. or more and 1400° C. or less and the sulfur grade of the hematite obtained after the heat treatment is 0.8% or less by weight.

A fifth aspect of the present invention provides the method for producing the hematite for ironmaking according to any one of aspects 1 to 3, wherein the heating temperature of the heat treatment is 1000° C. or more and 1400° C. or less and the sulfur grade of the hematite obtained after the heat treatment is 0.4% or less by weight.

The present invention can bring about the following industrial significant effects:

(1) it is possible to easily obtain hematite that has low-grade sulfur and can be used as an ironmaking raw material;

(2) since a raw material that can be cheaply and stably procured is used, hematite with the low-grade sulfur can be inexpensively obtained;

(3) products such as a leach residue discharged in a refining process can be applied to the ironmaking raw materials, and it is thus possible to remarkably reduce an amount of the scrapped leach residue and further reduce production costs by lowering an environmental risk, reducing disposal costs, and reducing construction costs of a leach residue disposal yard; and (4) when hematite with the low-grade sulfur is produced, a special facility is not required, and thus establishment of its producing process is easy.

DETAILED DESCRIPTION

The present invention intends to produce high-purity hematite that can be used as an ironmaking raw material having a low-grade sulfur, by heating a leach residue obtained when a mineral, such as nickel oxide ore, containing valuable metals and iron is subjected to high-pressure sulfuric acid leach, and then separating sulfur.

Figure 1:
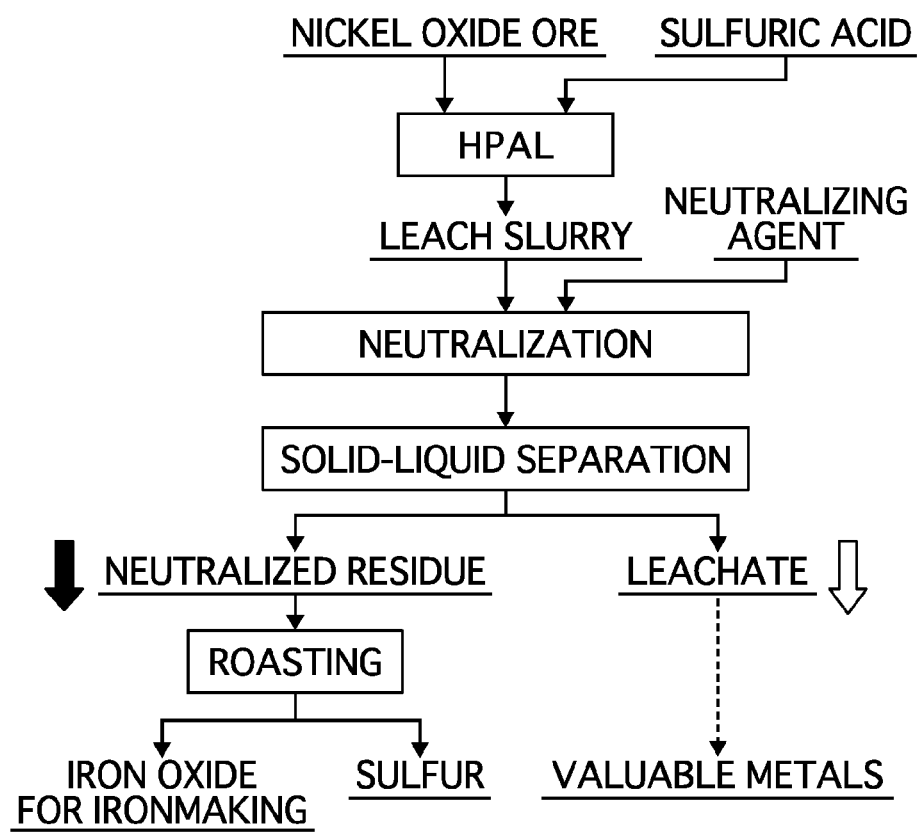
FIG. 1 is a flow chart showing a recovery process of performing high-pressure sulfuric acid leach on a mineral containing valuable metals and iron to recover the valuable metals, and further showing a refining process of hematite having low-grade sulfur which is associated with the recovery process.

FIG. 1 illustrates a flow for a recovery process of performing high-pressure sulfuric acid leach on a mineral, such as nickel oxide ore, containing valuable metals and iron to recover the valuable metals, and a further flow for a refining process of a production method according to the present invention of producing hematite having low-grade sulfur from a leach residue obtained in association with the recovery process.

The flow for the recovery process of the valuable metals is indicated by an outline arrow, and the flow for the refining process of the hematite according to the invention is indicated by a black arrow.

[Refining Process of Hematite]

A neutralized residue to be a starting raw material of the present process is solid matter obtained in such a manner that leach slurry, in which the leach residue and a leachate obtained by high-pressure sulfuric acid leach are mixed as illustrated in FIG. 1, is added with a neutralizing agent to neutralize surplus acid and is then subjected to solid-liquid separation. As such, the neutralized residue is formed in a state of containing the leach residue and a neutralized precipitate generated by the reaction of the neutralizing agent input in the neutralization process with the surplus acid.

Accordingly, depending on types of the neutralizing agents added for neutralizing a free sulfuric acid of the surplus acid remaining in the leach slurry, a leach residue containing sulfur in the form jarosite, a leach residue containing sulfur resulting from calcium sulfate (plaster) generated by the reaction of a Ca-based neutralizing agent such as limestone or slaked lime with a sulfuric acid, or a mixed leach residue of these leach residues is obtained.

It is possible to obtain a sulfur component of about 1% by weight in the former, but the leach residue contains a several percentage (%) of sulfur in the latter case of using the Ca-based neutralizing agent.

[Heating of Leach Residue]

Therefore, as a method of separating a sulfur component from such a leach residue containing several percentage of sulfur, the leach residue is heated on given conditions. That is, as illustrated in FIG. 1, the leach residue is roasted to evaporate the sulfur component so as to refine iron oxide (hematite) for ironmaking which has low-grade sulfur.

An effective temperature for heating the leach residue is 600° C. or more, preferably 800° C. or more, in order to make the sulfur grade in the leach residue less than 1%. Further, in the leach residue containing the sulfur in the form of plaster, when the heating temperature exceeds 800° C., the sulfur grade is sharply reduced, and when the heating temperature becomes 1300° C., the sulfur grade can be reduced up to 0.1% or less, which is more preferable. However, when the heating temperature exceeds 1400° C., this gives no great difference, and is not very preferable in the aspect of facility investment such as an increase in heating energy or a need for heat resistance of a furnace wall material. Accordingly, the heating temperature is 600° C. or more and 1400° C. or less, and preferably 800° C. or more and 1300° C. or less.

A heating time is affected by a furnace size and an amount of the residue, and thus may be adequately adjusted. Further, the heating is performed in an oxidizing atmosphere such as atmospheric air. Thereby, along with the heating, the sulfur is removed from the leach residue as sulfur dioxide, and the high-purity iron oxide (hematite) is formed.

EXAMPLES

Hereinafter, the invention will be described using examples.

Example 1

Nickel oxide ore having 1% nickel grade and 46 to 48% iron grade was adjusted to be slurry of 30 to 40% by weight, and then was mixed with sulfuric acid of 64% by weight. Subsequently, the slurry was charged into a pressure device, heated to 240 to 250° C., and maintained for one hour to obtain leach slurry of mixture of a leachate and a leach residue that were obtained by leaching nickel in the ore (HPAL).

After the leaching, the leach slurry was cooled to about 70° C., and then slaked lime as a neutralizing agent was added to neutralize surplus acid (sulfuric acid) (neutralization). The slurry containing a leach residue after the surplus acid was neutralized (hereinafter the leach residue after the neutralization is referred to as "neutralized residue") was subjected to solid-liquid separation using Nutsche and a filtering bottle to separate into the leachate and the neutralized residue (solid-liquid separation).

In the neutralized residue, an iron grade was 49.9%, and a sulfur grade was 1.5%.

Next, the neutralized residue was equally divided into six parts, which were respectively raised to 200° C., 600° C., 800° C., 1000° C., 1200° C., and 1400° C., heated for one hour, and then cooled.

Figure 2:
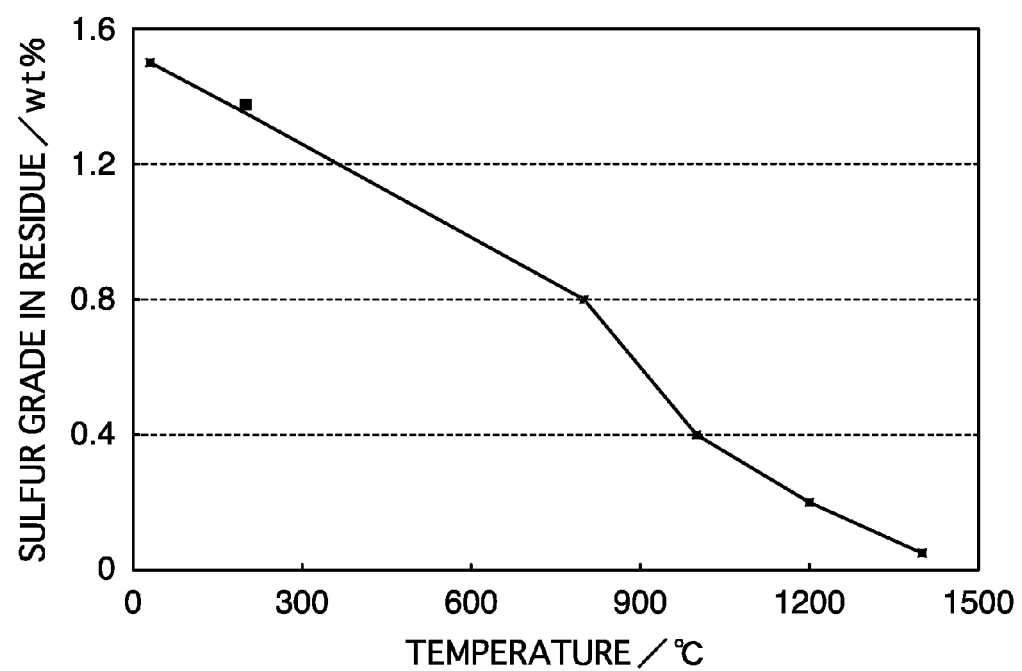
FIG. 2 is a diagram illustrating a relation between a heating temperature and a grade of sulfur in a leach residue according to a first embodiment of the present invention.

The sulfur grade of the leach residues after the cooling were analyzed, and the analyzed results were illustrated in FIG. 2.

As illustrated in FIG. 2, it is found that the sulfur grade is reduced up to about 1% at about 600° C., the sulfur grade is reduced to about 0.8% at 800° C., the sulfur grade is sharply reduced when the temperature exceeds 800° C., and the sulfur grade is reduced up to about 0.4% at 1000° C., so that the sulfur can be effectively separated.

Example 2

Nickel oxide ore having 1% nickel grade and 46 to 48% iron grade was adjusted to be slurry of 30 to 40% by weight, and then was mixed with sulfuric acid of 64% by weight. Subsequently, the slurry was charged into a pressure device, heated to 240 to 250° C., and maintained for one hour to obtain leach slurry by leaching nickel in the ore (HPAL).

After the leaching, the leach slurry was cooled to about 70° C., and then caustic soda as a neutralizing agent was added to neutralize surplus acid (sulfuric acid) (neutralization). The slurry containing a neutralized residue after the surplus acid was neutralized was subjected to solid-liquid separation using Nutsche and a filtering bottle to separate into a leachate and the neutralized residue (solid-liquid separation).

In the neutralized residue, an iron grade was 49.9%, and a sulfur grade was 0.6%.

Next, the neutralized residue was equally divided into four parts, which were respectively raised to 200° C., 600° C., 800° C., and 1000° C., heated for one hour, and then cooled.

As a result of an analysis of the sulfur grade of the leach residues after the cooling, when the caustic soda is used as a neutralizing agent, the grade of sulfur in the neutralized residue is 0.6%, which is lower-grade sulfur compared to Example 1, and it is possible to further reduce the sulfur grade up to 0.1% or less by heating to 600° C. or more.

Example 3

Nickel oxide ore having 1% nickel grade and 46 to 48% iron grade was adjusted to be slurry of 30 to 40% by weight, and then was mixed with sulfuric acid of 64% by weight. Subsequently, the slurry was charged into a pressure device, heated to 240 to 250° C., and maintained for one hour to obtain leach slurry by leaching nickel in the ore (HPAL).

After the leaching, the leach slurry was cooled to about 70° C., and then slaked lime and caustic soda as neutralizing agents were added to neutralize surplus acid (sulfuric acid) (neutralization). The slurry containing a neutralized residue after the surplus acid was neutralized was subjected to solid-liquid separation using Nutsche and a filtering bottle to separate into a leachate and the neutralized residue (solid-liquid separation).

In the neutralized residue, an iron grade was 49.9%, and a sulfur grade was 0.8%.

Next, the neutralized residue was equally divided into six parts, which were respectively raised to 200° C., 600° C., 800° C., 1000° C., 1200° C., and 1400° C., heated for one hour, and then cooled.

As a result of an analysis of the sulfur grade of the leach residues after the cooling, when both of the slaked lime and the caustic soda are used as neutralizing agents, the grade of sulfur in the neutralized residue can be intermediate between the sulfur grade obtained in Example 1 and the sulfur grade obtained in Example 2, and the sulfur grade can be further reduced up to about 0.2 to 0.4% by heating to the temperature of 600° C. or more and 1400° C. or less and preferably, the temperature of 800° C. or more and 1300° C. or less as in Example 1.

With such use of the invention, it is possible to separate sulfur from a leach residue obtained by an HPAL, and to refine hematite so as to be usable as the raw material for ironmaking.

The invention claimed is:

1. A method for producing hematite for ironmaking by a high pressure acid leach (HPAL) process of adding an oxidant and sulfuric acid to nickel oxide ore that contains iron and then leaching nickel, the method further comprising:

forming a neutralized residue having a sulfur content exceeding 1.0% by weight by adding a neutralizing agent to leach slurry to form a neutralized leach slurry and subjecting the neutralized leach slurry to solid-liquid separation, the neutralizing agent serving to form calcium sulfate by reaction with a free sulfuric acid of surplus acid contained in the leach slurry, the leach slurry being a mixture of a leachate and a leach residue obtained after leaching the nickel; and heating the neutralized residue at a heating temperature of 600° C. to 1400° C. to form hematite having a sulfur content of 1.0% or less by weight.

2. The method for producing the hematite for ironmaking according to claim 1, wherein the heating temperature during heating is 800° C. to 1400° C. and the sulfur content of the hematite obtained after the heat treatment is 0.8% or less by weight.

3. The method for producing the hematite for ironmaking according to claim 1, wherein the heating temperature during heating is 1000° C. to 1400° C. and the sulfur content of the hematite obtained after the heat treatment is 0.4% or less by weight.

4. A method for producing hematite for ironmaking by an HPAL process of adding an oxidant and sulfuric acid to nickel oxide ore that contains iron and then leaching nickel, the method further comprising:

forming a neutralized residue having a sulfur content exceeding 1.0% by weight by adding a neutralizing agent to leach slurry to form a neutralized leach slurry and subjecting the neutralized leach slurry to solid-liquid separation, the neutralizing agent serving to form a sulfur component in the form of jarosite by reaction with a free sulfuric acid of surplus acid contained in the leach slurry, the leach slurry being a mixture of a leachate and a leach residue obtained after leaching the nickel; and heating the neutralized residue at a heating temperature of 600° C. to 1400° C. to form hematite having a sulfur content of 0.6% or less by weight.

5. The method for producing the hematite for ironmaking according to claim 4, wherein the heating temperature during heating is 800° C. to 1400° C. and the sulfur content of the hematite obtained after the heat treatment is 0.8% or less by weight.

6. The method for producing the hematite for ironmaking according to claim 4, wherein the heating temperature during heating is 1000° C. to 1400° C. and the sulfur content of the hematite obtained after the heat treatment is 0.4% or less by weight.

7. A method for producing hematite for ironmaking by an HPAL process of adding an oxidant and sulfuric acid to nickel oxide ore that contains iron and then leaching nickel, the method further comprising:

forming a neutralized residue having a sulfur content exceeding 1.0% by weight by adding two types of neutralizing agents to leach slurry to form a neutralized leach slurry and subjecting the neutralized leach slurry to solid-liquid separation, one neutralizing agent serving to form calcium sulfate and another neutralizing agent serving to form a sulfur component in the form of jarosite by reaction with a free sulfuric acid of surplus acid contained in the leach slurry, the leach slurry being a mixture of a leachate and a leach residue obtained after leaching the nickel; and heating the neutralized residue at a heating temperature of 600° C. to 1400° C. to form hematite having a sulfur grade of 0.8% or less by weight.

8. The method for producing the hematite for ironmaking according to claim 7, wherein the heating temperature during heating is 800° C. to 1400° C. and the sulfur content of the hematite obtained after the heat treatment is 0.8% or less by weight.

9. The method for producing the hematite for ironmaking according to claim 7, wherein the heating temperature during heating is 1000° C. to 1400° C. and the sulfur content of the hematite obtained after the heat treatment is 0.4% or less by weight.

* * * * *